United States Patent
Perotin et al.

(10) Patent No.: US 9,951,699 B2
(45) Date of Patent: Apr. 24, 2018

(54) METHOD OF DETECTING A MALFUNCTION OF A VALVE IN A TURBOSHAFT ENGINE

(71) Applicant: Safran Aircraft Engines, Paris (FR)

(72) Inventors: Laurent Perotin, Moissy-Cramayel (FR); Mohamed Amer, Moissy-Cramayel (FR); Cédrik Djelassi, Moissy-Cramayel (FR); Julie Touya, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/323,254

(22) PCT Filed: Jun. 23, 2015

(86) PCT No.: PCT/FR2015/051674
§ 371 (c)(1),
(2) Date: Dec. 30, 2016

(87) PCT Pub. No.: WO2016/001520
PCT Pub. Date: Jan. 7, 2016

(65) Prior Publication Data
US 2018/0051640 A1    Feb. 22, 2018

(30) Foreign Application Priority Data

Jul. 2, 2014   (FR) ..................... 14 56310

(51) Int. Cl.
*G01M 15/14*   (2006.01)
*F02D 41/00*   (2006.01)
*F02C 7/057*   (2006.01)

(52) U.S. Cl.
CPC .......... *F02D 41/0007* (2013.01); *F02C 7/057* (2013.01); *F05D 2260/601* (2013.01);
(Continued)

(58) Field of Classification Search
USPC ....................................... 73/112.01
See application file for complete search history.

(56) References Cited

U.S. PATENT DOCUMENTS 7,328,098 B1 * 2/2008 VanderLeest ............. F02C 9/18
60/785
2002/0139180 A1   10/2002 Xiong et al.
(Continued)

FOREIGN PATENT DOCUMENTS

GB            2474638 A          4/2011

OTHER PUBLICATIONS

International Search Report dated Oct. 7, 2015, issued in corresponding International Application No. PCT/FR2015/051674, filed Jun. 23, 2015, 2 pages.
(Continued)

*Primary Examiner* — Eric S McCall
(74) *Attorney, Agent, or Firm* — Christensen O'Connor Johnson Kindness PLLC

(57) ABSTRACT

A method of monitoring a valve in a turboshaft engine, said valve switching, by closing and/or opening, in response to a control instruction sent at a determined instant, said method comprising calculating a first form of a time signal from the change in a status variable of said turboshaft engine reacting to a switching of said valve, applying a signature test of the switching of the valve to a form of said signal, wherein the method further comprises defining a time interval after sending said control instruction to perform said signature test; acquiring one or more parameters other than the switching of the valve; modelling a signal of said time signal in response to a change in said other parameter(s) to calculate its change; and calculating said second form of the signal is calculated from the first form of the signal by subtracting therefrom the change in the signal calculated from the
(Continued)

change in said other parameter(s), over said time interval following a control instruction.

10 Claims, 6 Drawing Sheets

(52) U.S. Cl.
CPC .... *F05D 2260/80* (2013.01); *F05D 2270/301* (2013.01); *F05D 2270/309* (2013.01)

(56) References Cited

U.S. PATENT DOCUMENTS

| | | | |
|---|---|---|---|
| 2014/0360255 A1* | 12/2014 | Javelot | F01D 21/20 73/114.38 |
| 2015/0046064 A1* | 2/2015 | Lahti | F02M 26/02 701/103 |
| 2015/0233289 A1* | 8/2015 | Younkins | F02B 77/082 73/114.79 |
| 2017/0269581 A1* | 9/2017 | Descoqs | G05B 23/0248 |

OTHER PUBLICATIONS

Written Opinion of the International Searching Authority dated Oct. 7, 2015, issued in corresponding International Application No. PCT/FR2015/051674, filed Jun. 23, 2015, 5 pages.

Written Opinion of the International Searching Authority dated Oct. 7, 2015, issued in corresponding International Application No. PCT/FR2015/051674, filed Jun. 23, 2015, 6 pages.

International Preliminary Report on Patentability dated Jan. 3, 2017, issued in corresponding International Application No. PCT/FR2015/051674, filed Jun. 23, 2015, 1 page.

* cited by examiner

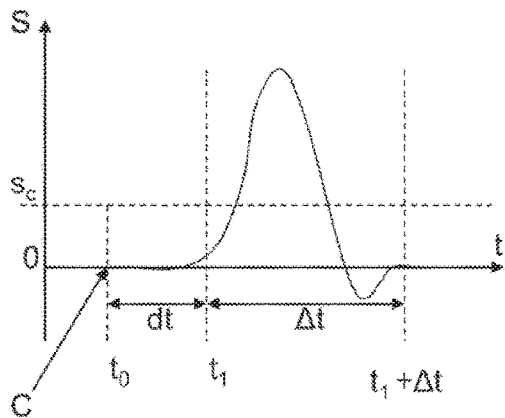
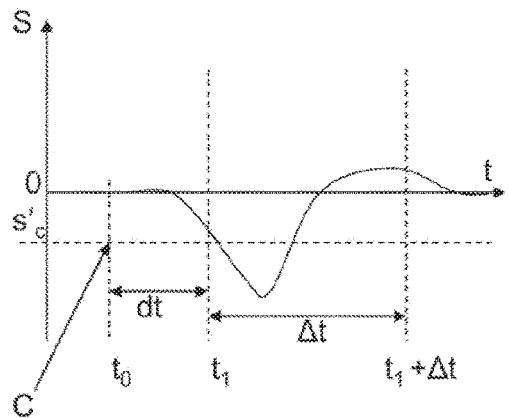
Fig. 1a                Fig. 1b
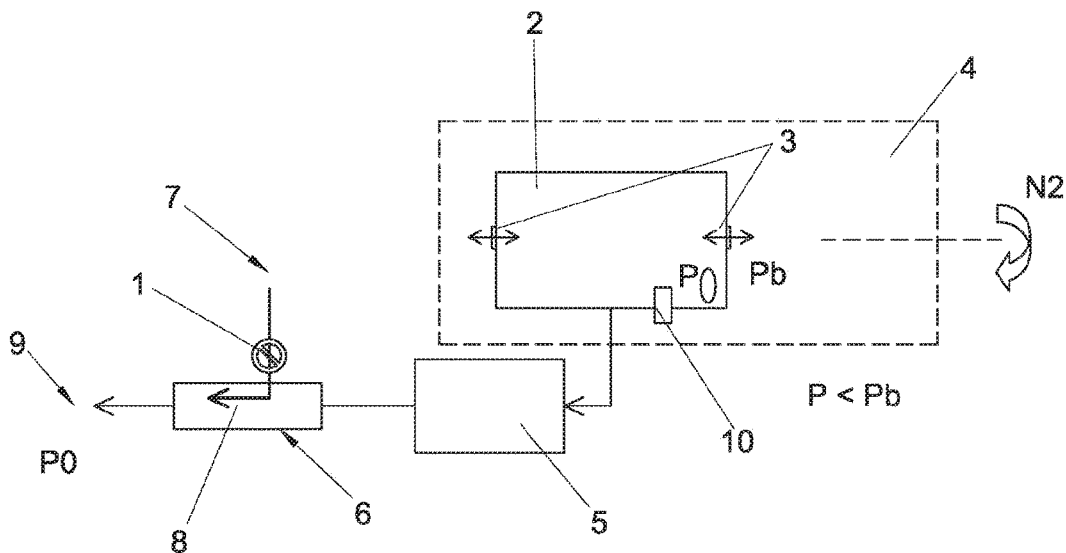
Fig. 2

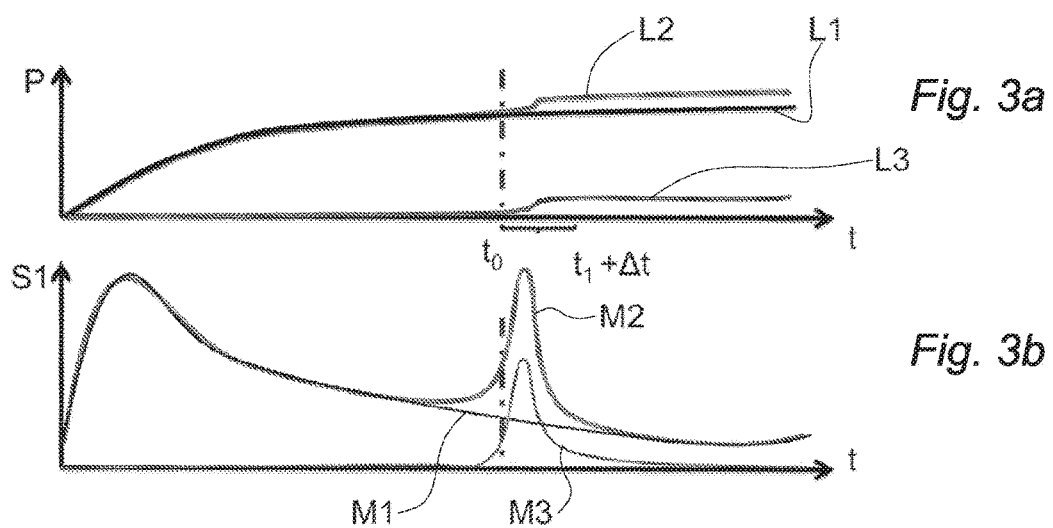
*Fig. 3a*
*Fig. 3b*
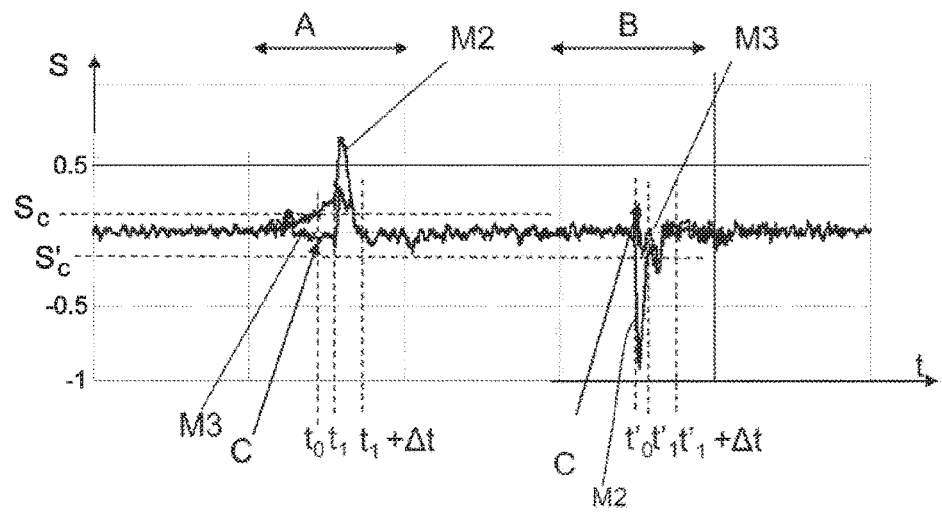
*Fig. 4*

METHOD OF DETECTING A MALFUNCTION OF A VALVE IN A TURBOSHAFT ENGINE

FIELD OF THE INVENTION

The present invention relates to the field of the control of fluid flow rates in a turbine engine. It relates more particularly to the control of the state of a valve operating on the all-or-nothing principle in one of the gas circuits of the turbine engine.

PRIOR ART

Valves operating on the all-or-nothing principle are used in turbine engines, for example upstream of a high-pressure compressor to discharge said compressor in particular operating circumstances of the engine or in jet ejectors that use air coming from the primary flow to control the depressurisation of the lubrication chambers of the bearings and gearboxes of the turbine engine (thus sealing said chambers).

Owing to costs and environmental constraints, some of said valves are not monitored by a position return sensor. However, it is important to monitor the state of said valves, in particular to isolate equipment that needs changing in the event of a malfunction. Moreover, said malfunctions, such as a valve that is locked open or closed, may be dormant until the appearance of an operational effect.

For example, a malfunction of a discharge valve positioned upstream of the compressor may produce engine events such as surge or unscrewing. The newer the engine, the greater its surge margin and the greater its tolerance of this type of malfunction. It is therefore not possible to be sure that a malfunction of this type of valve will automatically have an operational impact. Nevertheless, this dormancy phenomenon will lead to premature engine wear and may end up damaging the engine. Similar dormancy effects can also be observed in the example relating to the depressurisation circuit of the oil chambers.

It is therefore important to monitor the valve during operation of the turbine engine to determine whether or not it should be changed when it returns to operation. Furthermore, if an engine event is to be investigated (surge, for example), this helps the maintenance operator find the malfunctioning valve and thus reduces maintenance intervention times.

Methods exist to check whether such valves have in fact switched by observing the changes in an engine status variable that is sensitive to the state of the valve, even in the absence of operational consequences. For example, in document EP1978223 the change in the temperature of gases leaving the reactor is observed following a control instruction to the discharge valve. In another example, EP1926009, concerning a discharge valve, it is the change in the output pressure of the compressor that is observed.

The documents cited use filtering methods initially which allow some of the noise to be eliminated and the characteristic events to be isolated. In these methods, the signature of the switching of a discharge valve appears as a pronounced peak in the signal. However, in operational use, engine operation is rarely stabilised, for example a change in engine speed or the triggering of another device may modify the change in the variable under observation. To strip away environmental effects, the methods cited adapt the peak detection threshold to the operational conditions or inhibit detection in cases of parasitic events such as the triggering of another valve.

However, to avoid the detection in particular of false malfunctions in valves, which lead to an unnecessary maintenance operation, the known methods encounter two difficulties. On the one hand, it is not always possible to take account of all the environmental events because data relating thereto are not always available. Furthermore, even when adapting the threshold according to the environment, the effect or rather the lack of effect of the switching control instruction can be difficult to identify in the overall signal.

The object of the invention is to provide a means of responding to the difficulties encountered in order to identify with more certainty the effect of a valve switching malfunction on the change in a relevant parameter of the turbine engine by eliminating disruptions due to environmental changes. In particular, the invention seeks to avoid the detection of false malfunctions while allowing a replacement of the valve being monitored to be prepared, if necessary.

DISCLOSURE OF THE INVENTION

Accordingly, the invention proposes a method of monitoring a valve in a turboshaft engine, said valve switching, by closing and/or opening, in response to a control instruction sent at a determined instant, said method comprising a step of calculating a first form of a time signal from the change in a status variable of said turboshaft engine reacting to a switching of said valve, then a step of applying a signature test of the switching of the valve to a second form of said signal calculated from said first form. Said method is notable in that it also comprises a step in which a time interval is defined after sending said control instruction to perform said signature test, and in that the change in one or more parameters other than the switching of the valve being known and the change in said time signal in response to the change in said other parameter(s) being calculable, said method comprises a step, known as the desensitisation step, in which said second form of the signal is calculated from the first form of the signal by subtracting therefrom the change in the signal calculated from the change in said other parameter(s), over said time interval following a control instruction.

The definition of a time interval following the sending of the control instruction allows monitoring of the valve to be concentrated on the portion of the signal that corresponds to the expected effects of switching following the control instruction. Correspondingly, the method can seek a signal that correlates with the valve control instruction over said time interval to avoid taking account of external phenomena when the valve switching signature test is applied. This characteristic helps avoid sending malfunction detection alarms that would result in an unnecessary maintenance operation, whereas the valve is operational.

The 'desensitisation' step makes it possible to obtain a much more characteristic valve-switching signature. In some cases, this means that the signature test need not be parameterised depending on the conditions of use of the turboshaft engine at the time the valve is switched.

In general, said signal represents the time derivative of said status variable, preferably filtered. The variations of said derivative resemble a slot, and are easier to characterise than the variations in the status variable, which can be masked by a transient change.

In particular, said status variable may be a gas pressure in a turboshaft engine circuit. The signature of the valve operation may correspond to the test of the signal passing through a peak value which must exceed a given threshold, in a positive or negative direction. A given period can be introduced between sending the valve switching control instruction and said time interval. This allows the response time of the installation to the switching of the valve to be taken into account.

Advantageously, said method comprises a test in the step for determining the time interval for not launching the subsequent steps if two opposite valve switching control instructions succeed one another with a fixed time period. This helps avoid false measurements where the valve does not move owing to the reaction time thereof to the control instruction.

In particular, in a first alternative embodiment, the method can determine said second signal form as being said first signal form following the desensitisation step.

In a second alternative embodiment, the method also comprises a step in which a confirmed malfunction is identified if no response has been obtained in the signature test application step for a series of n consecutive control instructions including the current control instruction, n being greater than or equal to two, the absence of a confirmed malfunction being identified in the contrary case.

Said second alternative embodiment allows account to be taken of the random occurrence of events that disrupt measurement of the variable from which the tested signal is created. It favours maintaining operation of the turboshaft engine if it is not certain that a malfunction has occurred over detecting said malfunction, said malfunction having a good chance of being detected during the next monitoring sequence if it is confirmed. The number n, which is equal to two if it is decided that a single repetition of the absence of a signal for two consecutive control instructions is sufficient to confirm a malfunction, can be adjusted depending on the probability of the occurrence of events that have not been modelled.

Advantageously, such a method comprises a step of storing in memory the result of the application of the signature test. This allows in particular said memory to be searched after an operation in order to ascertain the history of the valve.

Such a method can be applied to an installation in which said valve is a valve supplying a jet ejector that depressurises at least one oil chamber of the turboshaft engine. In this case, the status variable is the pressure in an oil supply circuit of said chamber, and the method uses a desensitisation step, the other parameter influencing said signal being the rotational speed of the turboshaft engine.

A second embodiment of the invention concerns a method of monitoring a valve in a turboshaft engine, said valve switching by closing and/or opening in response to a control instruction sent at a given instant, said method comprising a step of calculating the first form of a time signal from the change in a status variable of said turboshaft engine reacting to a switching of said valve, then a step of applying a signature test of the switching of the valve to a second form of said signature calculated from said first form. Said method is notable in that it also comprises a step in which a time interval is defined after sending said control instruction to perform said signature test, and in that said method comprises a step in which a confirmed malfunction is identified if no response has been obtained in the signature test application step for a series of n consecutive control instructions including the current control instruction, n being greater than or equal to two, the absence of a confirmed malfunction being identified in the contrary case.

Advantageously, the second signal form is equal to the first signal form.

If the change in one or more parameters other than the switching of the valve is known and the change in said time signal in response to the change in said other parameters can be calculated, said method may comprise a step, known as the desensitisation step, in which said second form of the signal is calculated from the first form of the signal by subtracting therefrom the calculated change in the signal from the change in said other parameter(s) over said time interval following a control instruction.

Said second embodiment allows account to be taken of the occurrence of random events that disrupt measurement of the variable from which the tested signal is created. It favours maintaining operation of the turboshaft engine if there is uncertainty about the occurrence of a malfunction over detecting said malfunction, said malfunction having a good chance of being detected during the next monitoring sequence, if it is confirmed. The number n, which is equal to two if it is decided that a single repetition of the absence of a signal for two consecutive control instructions is sufficient to confirm a malfunction, can be adjusted depending on the probability of the occurrence of events that have not been modelled.

The definition of a time interval after sending the control instruction has the same functions as those described for the previous embodiment. In the same way, in the second embodiment:

said signal may represent the time derivative of said status variable, preferably filtered, said status variable may be the gas pressure in a turboshaft engine circuit, the valve operating signature may correspond to a test of the signal passing through a peak value which must exceed a given threshold, in a positive or negative direction, a given period may be introduced between sending the valve switching control instruction and said time interval, and said method may comprise a test in the step for determining the time interval for not launching the subsequent steps if two opposite valve switching control instructions succeed one another within a given time period.

Advantageously, this type of method comprises a step of storing in memory the result of the application of the signature test. This can allow, in particular, a search of said memory after an operation to ascertain the history of the valve.

A method according to the invention may also be applied to monitoring the operation of a discharge valve placed in the flow passing through a compressor of the turboshaft engine. In this case, the method uses the second embodiment, the status variable being the measured pressure in the flow passing through said compressor and the switching corresponding to the control instruction of said valve being closure.

BRIEF DESCRIPTION OF THE FIGURES

The present invention will be better understood and other details, characteristics and advantages of the present invention will appear more clearly on reading the description that follows, with reference to the accompanying drawings in which:

FIG. 1a shows the change over time of a function of an engine variable during the closure of a valve.

FIG. 1b shows the change over time of a function of an engine variable during the opening of a valve.

FIG. 2 is a diagram of a first example of an installation containing a valve of which the operation is to be monitored.

FIGS. 3a and 3b show diagrammatically the principle of eliminating the influence of some parameters in order to monitor the operation of the valve by observing the change in pressure and its time derivative.

FIG. 4 shows the result of the application of the principle presented in FIGS. 3a and 3b to the operation of the installation shown in FIG. 2.

DETAILED DESCRIPTION OF THE INVENTION

Figure 5:
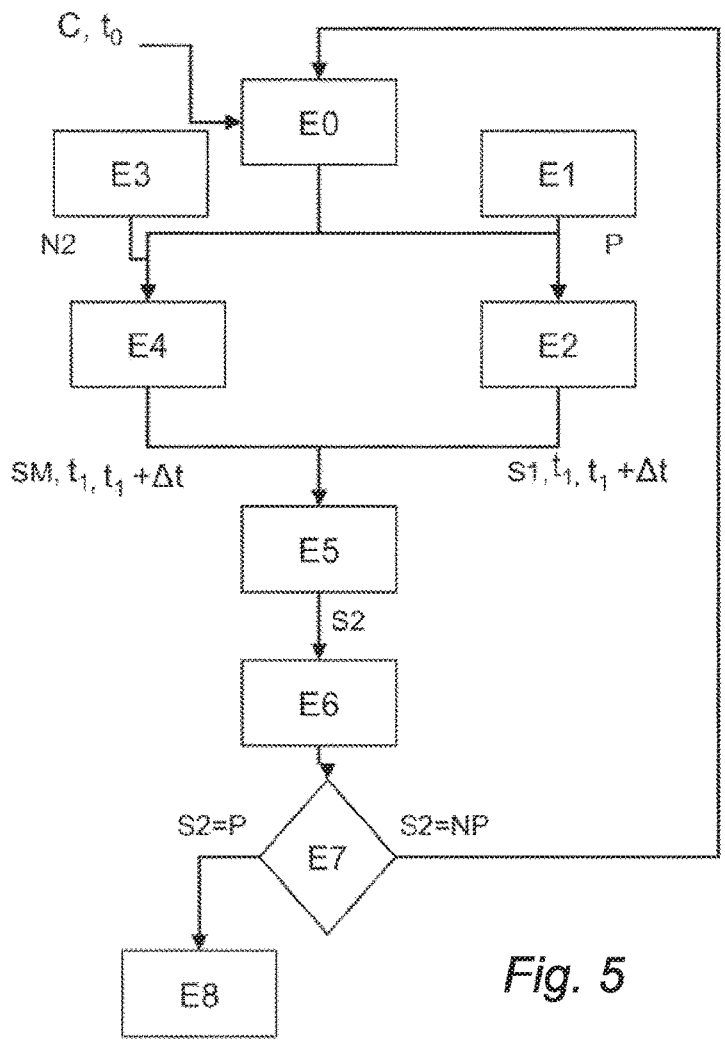
FIG. 5 shows a first embodiment of the method according to the invention applied to the installation shown in FIG. 2.

With reference to FIGS. 1a and 1b, the invention relates to a method using a test on a signal S linked to the change in a status variable V of the engine during a change of status of the valve being monitored. The test therefore corresponds to identifying a characteristic signature of the change in the signal S as a function of the time t following a control instruction C to switch the valve.

The variable V may be gas pressure for example measured in a location of the engine circuit comprising the valve and the signal S may represent the time derivative dvd/ddt of the change in said variable. In general, the signal S represents the normalised time derivative (dVd/ddt)/V of the status variable, in other words divided by the value of the variable to obtain relative values.

In FIG. 1a, the engine is at a stable speed prior to the control instruction C to close the valve which takes place at time $t_0$. The pressure is therefore constant and the signal S(t) is zero. In the example considered, the valve closes an outlet of the circuit, and its closure therefore leads to a rise in pressure which stabilises at another value.

Given the response times of the entire system, the change in the signal S(t) is particularly significant following a period ddt, over a time interval $[t_1, t_1+\Delta t]$, where $t_1=t_0+dt$. In the interval $[t_1, t_1+\Delta t]$, the signature of the valve closure corresponds to a positive peak on the signal S(t) which passes systematically above a threshold value $S_c$ when the valve closes, said threshold $S_c$ being far enough from zero that it cannot be crossed when the valve does not switch.

In the example considered, the test used by the method therefore corresponds to initiating observation of the signal S(t) over a time interval $[t_1, t_1+\Delta t]$ after sending the valve switching control instruction C at time $t_0$, then verifying the existence or absence of an effective valve switching signature on the signal S(t) by testing that it has crossed a threshold $S_c$ over the time interval $[t_1, t_1+\Delta t]$.

Switching the valve to open may also have a notable signature. FIG. 1b illustrates the case where opening the valve leads to a fall in pressure compared to the stabilised speed. In a substantially symmetrical manner to the previous case, the signal S(t) then passes in the time interval $[t_1, t_1+\Delta t]$ through a negative peak crossing a threshold $S'_c$. The test used by the method therefore monitors the crossing of said threshold $S'_c$ during the time interval $[t_1, T_1+\Delta t]$.

The test has been presented for the case where the variable is pressure but other characteristic engine variables may be used to create the signal S(t), depending on the functions performed by the valve being monitored. This may for example be the gas temperature leaving the primary gas generator.

Moreover, the invention takes account of disruptions compared to the simplified case that has just been presented. The engine may change speed and external events may disrupt the change in the variable from which the state of the valve is being monitored. The method is designed to detect a malfunction of the valve in response to a switching control instruction C during different phases of use of the engine.

The way in which the invention allows detection of a malfunction from the preceding test to be made more reliable is presented below in two examples using pressure as the significant variable of the status of the valve being monitored.

First Embodiment

The first embodiment of the invention corresponds to monitoring a depressurisation valve 1 of the oil chambers 2 of an engine 4.

The characteristics of the installation where the valve 1 operates are shown in FIG. 2. Sealing of the joints 3 of the oil chambers 2 is assured by a negative pressure difference (P−Pb) through joints 3 with the rest of the engine 4. It proves necessary to provide this pressure difference at some speeds by forced depressurisation. The oil circuit comprises at least one chamber 2 where there is air above the oil. In this case, depressurisation takes place by an air system in the following manner:

- Air is sucked in by a jet ejector 6, the role of which is to create a fall in pressure in the chambers 2.
- The circuit connecting the jet ejector 6 to the chambers 2 usually comprises a de-oiler 5 to remove oil from the oily air recovered in said chambers.
- Pressurised air, originating from the primary flow 7 in the engine 4, is injected into the jet ejector 6 by two nozzles 8 to create suction.
- The air is discharged into the secondary flow 9 of the engine 4.

Said depressurisation must be regulated according to the flight conditions. For example, at low altitude and on starting, strong suction is necessary to depressurise the chambers 2 and seal the joints 3, as mentioned earlier. However, at high altitude in particular, as the pressure P in the chambers 2 is dependent on the ambient pressure P0, the need for depressurisation is lower. Moreover, the chambers 2 are supplied with oil by recovery pumps that could be drained if depressurisation is too great.

The valve 1 being monitored controls the injection of primary air 7 into the jet ejector 6 by opening and closing one of the two nozzles 8. There are two possible configurations:

The control valve 1 is closed, the primary air 7 only passes through one nozzle 8 and depressurisation of the oil chambers 2 is low.

The valve 1 is open, the primary air 7 passes through both nozzles 8 and depressurisation of the oil chambers 2 is high.

A valve 1 that is locked open can therefore result in draining the recovery pumps and stopping the engine 4 at high altitude. However, it will not have any consequences below a given altitude and will therefore be dormant in these conditions.

However, a valve 1 that is locked closed will result in a slight loss of sealing in the region of the joints 3 and will be difficult to detect in the oil level. It too will therefore be dormant for some time.

To detect these malfunctions, the method according to the invention applies the test described earlier to the signal S(t) obtained by measuring the oil pressure P(t) in the chambers 2, for a time interval $[t_1, t_1+\Delta t]$ following the control instruction C to switch the nozzles 8 of the jet ejector 6. As in the example shown in FIGS. 1a and 1b, the signal S(t) corresponding to a normalised time derivative of the pressure P(t) shows a peak which crosses a positive threshold Sc when the valve 1 closes and crosses a negative threshold S'c when it opens. The numeric values of the thresholds Sc, S'c and the periods dt and $\Delta t$ from the moment $t_0$ when the control instruction C to switch the valve 1 is sent are adjusted according to the physical characteristics of the installation described in FIG. 2.

With reference to FIG. 5 the method therefore comprises an initial step E0 which consists of recording the occurrence of a control instruction C to switch the valve 1 at a moment $t_0$. In parallel, a first step E1 consists of measuring the pressure P(t) with a sensor 10 in the oil chambers 2. Step E1 may possibly be coupled with step E0 so as only to initiate the measurements when a control instruction C is sent.

The method next comprises a step E2 which supplies a first form S1(t) of the signal S(t) over the time interval $[t_1, t_1+\Delta t]$. Said step E2 may comprise a plurality of sub-steps. Step E2 comprises the calculation of the normalised time derivative S(t) of the pressure P(t) from the measurements. Said calculation is intended to eliminate errors due to measurement sampling carried out by the sensor 10 and to overcome disruptions that create parasitic oscillations, particularly in the time derivative. Persons skilled in the art will therefore be able to use a number of filtering methods in said step E2 which are of benefit to the method but do not fall within the scope of the invention.

However, a malfunction detection based on the test as described with reference to FIG. 1a or 1b, applied to the signal S1(t) obtained directly from the pressure measurement P in the oil chambers 2 is not reliable. The influence of other parameters can distort detection. In the installation under consideration, only the speed of the engine 4 has a notable influence on the rapid changes in pressure P in the chambers 2. Strong acceleration or marked deceleration of the rotational speed of the engine 4 will result in a pronounced variation in pressure P which can mask the effects of a movement of the valve 1 on the signal S1(t) on exiting from step E2.

The rotational speed N2 of the engine 4 can easily be measured and its effect on the pressure P(t), and thus on the signal S1(t), can be modelled. To find the signature of the switching of the valve 1 in the signal S1(t), it is therefore possible to apply thereto a method, known as a desensitisation method, the principle of which is illustrated in FIGS. 3a and 3b.

With reference to FIG. 3a, an increase in speed N2, for example, leads to a positive change in pressure P represented by the curve L1. If the valve 1 is closed at moment $t_0$, this leads to a sudden, but low-amplitude, jump in pressure compared to the pressure variations in the acceleration phase, as shown by curve L2. This phenomenon is amplified if, with reference to FIG. 3b, the variations are considered in the signal S1(t) on leaving step E2, corresponding to the normalised derivative dP/P, represented by curves M1 and M2, matching curves L1 and L2. Initially, the peak value observed in curve M2 at the start of acceleration is similar to, or even greater than, that observed following the moment of closure $t_0$ of the valve 1. A threshold test can therefore confuse acceleration with closure of the valve 1. Furthermore, the intensity of the peak of M2 over the time interval $[t_1, t_1+\Delta t]$ following the instant $t_0$ when the valve 1 closes depends on the environment.

If the rotational speed N2 is known, the desensitisation method consists of reconstituting by modelling a signal SM(t) corresponding to the curve M1, then subtracting the modelled signal SM(t) from the signal S1(t) obtained by step E2 and corresponding to curve M2. Curve M3, shown in FIG. 3b, is thus obtained. A similar operation can be carried out on the pressure P(t) to obtain curve L3. However, the result is particularly noteworthy on curve M3, showing the normalised and desensitised pressure derivative. The peak value due to the start of acceleration has in fact disappeared.

Moreover, the normalisation of the signals, i.e. by using the time derivative of the measured magnitude divided by the value of said magnitude, for the pressure P and the rotational speed N2, allows a change to be shown as a percentage and in particular to overcome the effects relating to the level of pressure P at which the reading can be found on curves L1 or L2, at the moment the valve 1 closes. This allows a threshold value Sc, S'c for the test to be defined more easily, independently of the operating conditions of the engine 4.

The method according to the invention therefore also uses a step E3 of acquiring the rotational speed N2(t) of the engine 4 over time. Next, a step E4, using the time change N2(t) of said rotational speed and the information originating from step E0 on the occurrence of the closing or opening control instruction C of the valve 1 at time $t_0$, reconstitutes, with the aid of a model, the signal SM(t) that would be obtained over the time interval $[t_1, t_1+\Delta t]$ without switching the valve 1. Said step E4 preferably uses filtering methods similar to those used in step E2 to reconstitute the normalised derivative of a parameter based on a sampling of said parameter over time.

The method next comprises a step E5, known as the desensitisation step, which supplies a second form S2(t) of the pressure derivative signal by subtracting over the interval $[t_1, t_1+\Delta t]$, the signal SM(t) from the first form of the signal S1(t) obtained on leaving step E2. It can also be said that the signal form S2(t) is correlated to the movements of the valve 1 whereas the previous signal form S1(t) comprises parasitic data.

FIG. 4 shows the results obtained with said method for an operating case of the installation described in FIG. 2, during which, for a first time interval A, an acceleration in the rotational speed N2 is superimposed on a closure of the valve 1 and, for a second time interval B, a deceleration of N2 is superimposed on an opening of the valve 1.

In a similar manner to that shown in FIG. 3b, the curve M2 of FIG. 4 represents the change in the first signal form S1(t) on leaving step E2 and curve M3 represents the change in the second, desensitised signal form S2(t), obtained on leaving step E5 for time intervals [$t_1$, $t_1+\Delta t$] following the control instruction C of valve 1. It will be seen that the peak caused by the acceleration is corrected on the signal S2(t) so as to retain only that caused by the movement of the valve 1. This observation also holds good for the deceleration phase at B, during the interval [$t'_1$, $t'_1+\Delta t$] following the opening of the valve 1 at $t'_0$.

On leaving step E5, the method comprises a step E6 which applies the signature test, described with reference to FIGS. 1a and 1b, to the second signal form S2(t). With reference to FIG. 4, step E6 may use a different threshold Sc or S'c depending on whether control instruction C sent to the valve 1 corresponds to a closure or an opening.

The next step E7 determines that the second signal form S2(t) effectively represents the response of the system to a change in status of the valve 1. Thus, if the signature test notes a change in status of the valve 1, step E7 concludes therefrom that the valve 1 is operating correctly (S2=NP) and reinitialises the method at step E0 to monitor the valve 1 at the time of the next switching control instruction C.

If the signature test does not record a change in status of the valve 1, step E7 concludes that a malfunction (S2=P) of the valve 1 has occurred and the method moves on to step E8 which supplies the malfunction information in an appropriate form.

Figure 6:
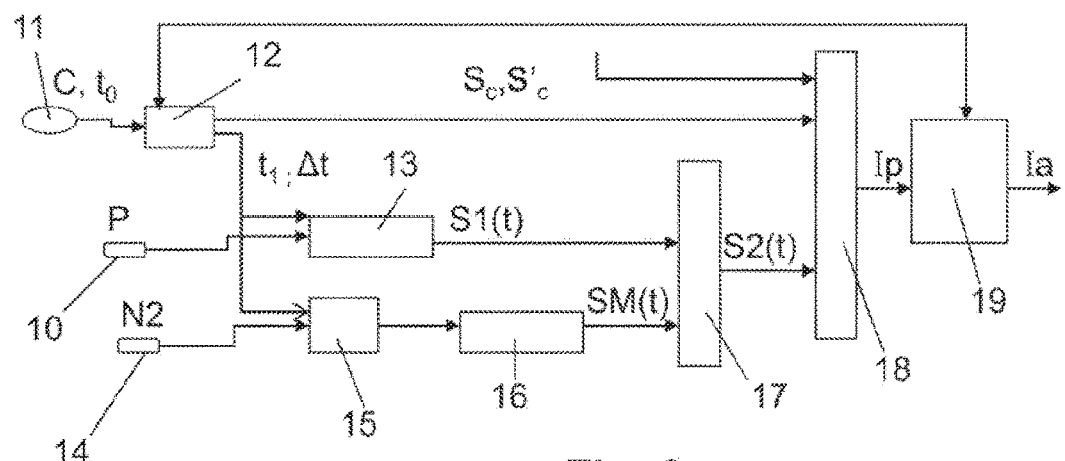
FIG. 6 is a functional diagram of a device implementing the first embodiment of a method according to the invention, in the installation shown in FIG. 2.

With reference to FIG. 6, a malfunction detection system suitable to implement the method comprises an electronic circuit and sensors.

A first branch of the circuit is connected to the switching control system 11 of the valve 1 and comprises a clock module 12 which detects a closing or opening control instruction C of the valve 1 at an instant $t_0$ and which determines the limits of the time interval [$t_1$, $t_1+\Delta t$] used for the signature test.

A second branch of the electronic circuit is connected to a pressure sensor 10 in the oil chambers 2 and comprises a module 13 capable of filtering and deriving the signal P(t) of the sensor 10. Said module 13, connected to the clock module 12, supplies the signal form S1(t) on leaving over the time interval [$t_1$, $t_1+\Delta t$].

A third branch of the electronic circuit is connected to a sensor 14 of the rotational speed N2(t) on the shaft of the engine 4. It comprises a module 15 capable of filtering and deriving the signal N2(t) from the sensor 14 in order to supply a normalised signal from the signal supplied by the sensor 14. This result is then used by a modelling module 16, which supplies the signal SM(t) modelling the response of the installation in the absence of any movement of the valve 1. A way of producing said modelling module 16 consists of applying previously established tables, with delays to take account of the time needed for the pressure to become established in the oil chambers 2.

The signal SM(t) leaving the modelling module 16 is subtracted from the signal S1(t) by a module 17 effecting the differences.

A test module 18, receiving the signal S2(t) on leaving the module 17 that effects the differences, connected to the clock module 12 and parameterised according to the chosen thresholds Sc, S'c, carries out the signature test over the time interval [$t_1$, $t_1+\Delta t$] following the control instruction C of the valve 1 and sends a logical malfunction or operational result Ip to a control module 19, which manages the progress of the method and the sending of the alarms Ia.

Second Embodiment

The second embodiment of the invention corresponds to the monitoring of a discharge valve 21 allowing a high-pressure compressor 22 to be discharged in some operating circumstances of the engine 23.

Figure 7:
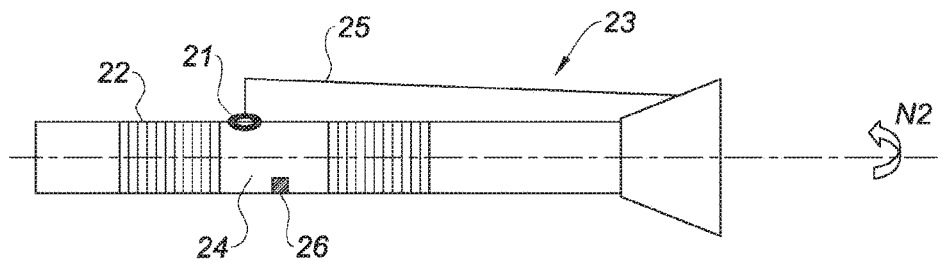
FIG. 7 is a diagram of the second example of an installation containing a valve of which the operation is to be monitored.

With reference to FIG. 7, in the example being considered, said valve 21 is situated in the stream 24 of the primary flow, downstream of a high-pressure axial compressor 22 which is generally upstream of a centrifugal compressor which is not shown in the figure, before the subsequent stages of the engine. As it opens, said valve 21 communicates with a conduit 25 which diverts a portion of the primary flow, generally towards the secondary flow. Depending on the position of the discharge valves 21, the surge margin can be increased or the specific fuel consumption can be improved.

Each of said discharge valves 21 is usually controlled in all-or-nothing mode, and owing to its situation in a very hot environment it is not usually equipped with position measurement.

However, as mentioned in the pre-characterising clause, it is important to ascertain the operating state of each of the discharge valves 21, as in some cases the malfunction may remain dormant. Detection of a malfunction thus allows intervention before the effects of the malfunction have any consequences on the state of the engine 23.

The opening or closing of a discharge valve 21 upstream of the compressor 22 takes the form of a variation in pressure P on leaving the compressor 22. A pressure sensor 26, usually placed at the outlet of the compressor 22, just after the discharge valve 21, records any sudden changes in the level of pressure P during opening or closing of the valve 21.

The method according to the invention therefore begins by determining, as in the first embodiment, a first signal form S1(t) corresponding to the normalised time derivative of the pressure P measured by the sensor 26, over a time interval [$t_1$, $t_1+\Delta t$] following the instant $t_0$ of the control instruction C of the valve 21.

Figure 9:
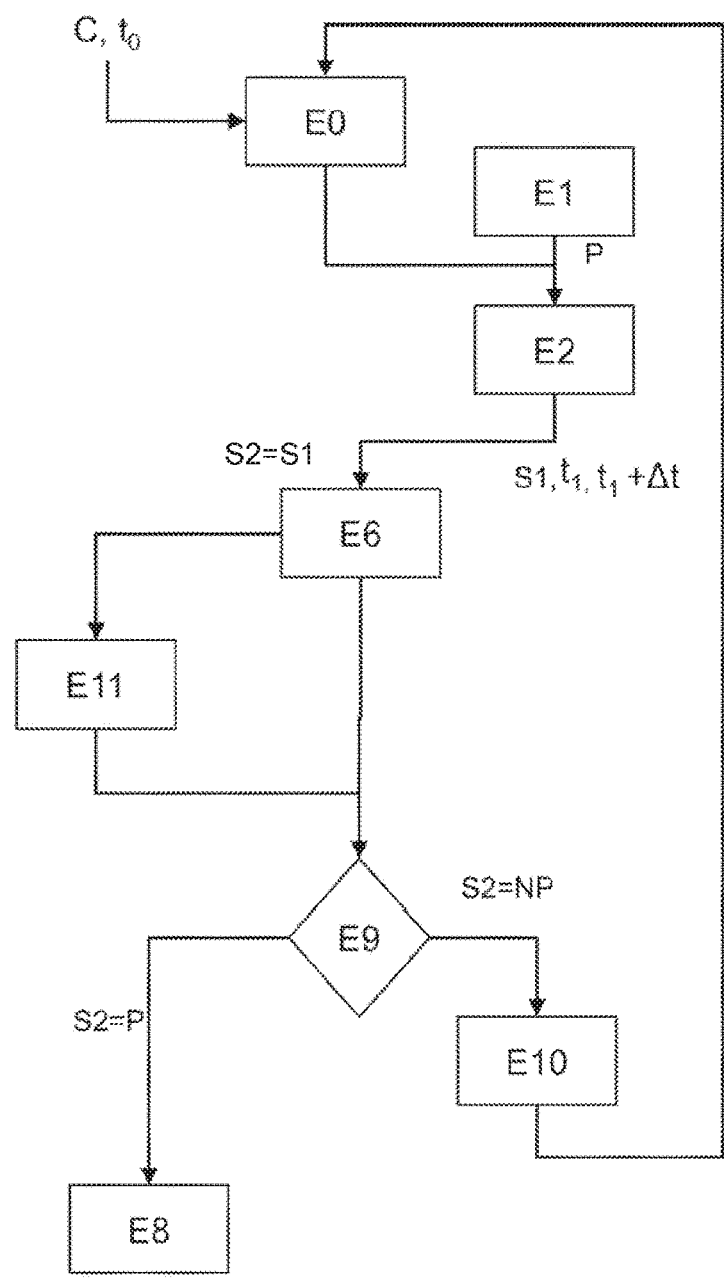
FIG. 9 shows a second embodiment of a method according to the invention applied to the installation shown in FIG. 7.

With reference to FIG. 9, the method therefore also comprises an initial step E0 consisting of recording the occurrence of a switching control instruction C of the valve 21 at an instant $t_0$. In parallel, a first step E1 consists of measuring the pressure P(t) with the sensor 26. Step E1 may possibly be coupled with step E0 so as only to initiate measurements when a control instruction C is sent.

The method next comprises a step E2 which supplies a first form S1(t) of the signal S(t) over the time interval [$t_1$, $t_1+\Delta t$]. Said step E2 is carried out with techniques similar to those of the first embodiment and preferably comprises filterings.

Figure 8A:
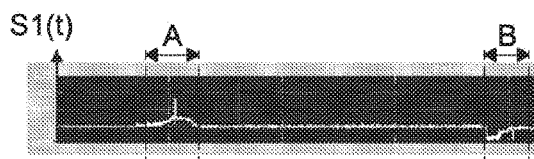
FIGS. 8a to 8c show the change in a pressure variable in the installation in response to the operation of the valve for various environmental conditions.
Figure 8B:

In the case of a discharge valve 21, as can be seen in FIG. 8a, the first signal form S1(t) on the pressure shows significant value peaks during a switching of the valve 21, indicated at two instants $t_0$, $t'_0$ in FIG. 8b. However, two important differences in the behaviour of the system lead to a modification of the way in which the method determines, from S1(t), a signal S2(t) which will be defined as being correlated with the control instruction C for switching the valve 21.

Figure 8C:

FIG. 8a shows the change in the signal S1(t) during a first time interval A in which a closing of the valve 21 and a strong acceleration of the speed N2 of the engine 23 are superimposed, then during a second time interval B in which an opening of the valve 21 and a strong deceleration of the speed N2 of the engine 23 are superimposed. On this subject, FIG. 8c indicates the change in the rotational speed N2 of the engine 23.

In this case, unlike in the previous case, the peak value for a closure of the valve 21 is markedly greater than the variations that a change, even a rapid change, in the speed N2 of the engine 23 could cause. A sufficiently high threshold Sc can therefore be set to test the closure of the valve 21 without being concerned over changes in the rotational speed N2 of the engine 23. The change in S1(t) in the second time interval B shows that this is not necessarily the case for an opening of the valve 21.

The method does not use any desensitisation step and only monitors closures of the valve 21. It therefore comprises, in step E0, a selection that only starts observations if the switching corresponds to a closing of the valve 21.

A second difference, not shown in FIG. 8, arises from the fact that the system may be disrupted by phenomena that are not monitored by the control system of the engine 23 and are therefore difficult to foresee. This may, for example, be the opening or closure of valves that remove air from the primary circuit in order to regulate the pressurisation system of the aircraft cabin. Such events, or simply poor operation of the sensor 26, can mask the closure signature of the valve 21 during the test on the signal S1(t), or the absence of said signature.

To make malfunction detection more robust, in particular to avoid sending a false malfunction alarm, the method introduces counting to determine a signal S2(t) that is certain to correspond to a response to a closure control instruction C of the valve 21.

In this embodiment, the signal S2(t) is taken equal, initially, to the signal S1(t). The method comprises a step E6 of applying the signature test to the signal S2(t) on leaving step E2, with reference to FIG. 9. The test is applied in the same way as that applied to the signal S2(t) leaving step E5 by the signature test of the method of the first embodiment, with reference to FIG. 5. The result provided by the test is the presence or absence of a closure signature of the valve 21 in S2(t).

On leaving, a monitoring step E9 manages a counter i. Said counter is set to zero at the start of implementation of the method. Next, said counter i is incremented by 1 each time leaving the signature test step E6 indicates the absence of a response on the signal S2(t) and set to zero again each time the signature test indicates a response.

Said counter is then compared with a predetermined threshold n, to confirm the malfunction if said threshold is exceeded.

In other words, if the signal S2(t) tested during the preceding step E6 corresponds to a sequence of n+1 consecutive absences of a response, it is then considered in the monitoring step E9 that it is a signal form S2(t) that is effectively correlated to the valve control instruction and that it corresponds to a malfunction.

In the example shown, a threshold n equal to 1 is used, which corresponds to two consecutive absences of a response. Higher threshold values n are possible.

In this case, the monitoring step E9 triggers a step E8 signalling a confirmed malfunction, similar to that of the first embodiment.

If the counter i is not zero but is below the threshold, the signal S2(t) tested following the valve control instruction that has just been sent is considered in step 9 to not be sufficiently correlated with said control instruction. Step E9 is therefore exited to continue monitoring the system without going through step E8 signalling a confirmed malfunction.

If the counter i is zero, there is no explicit decision in the monitoring step as to whether or not there is a signal correlation but the same result is reached as in the previous case. Step E9 is therefore exited as well, and no malfunction is signalled.

In a first alternative embodiment of the method shown in FIG. 9, in the case where the counter is not zero but is below the threshold, it is possible, in a step E10 following the monitoring step E9, to store the information in memory in order to signal an unconfirmed malfunction later during a maintenance operation.

In another alternative embodiment of the method, if there is a wish to verify that the cases that had a response to the valve control instruction have indeed been confirmed, it is possible to install logic in the monitoring step E9 to count the successive sequences of positive results to the signature test, similar to the one that has just been described for cases where there was no response.

The threshold $S_c$ and the periods that determine the interval $[t_1, t_1+\Delta t]$ are parameters that have been previously defined for the operation of the method, in relation to the operation of the engine 23.

Figure 10:
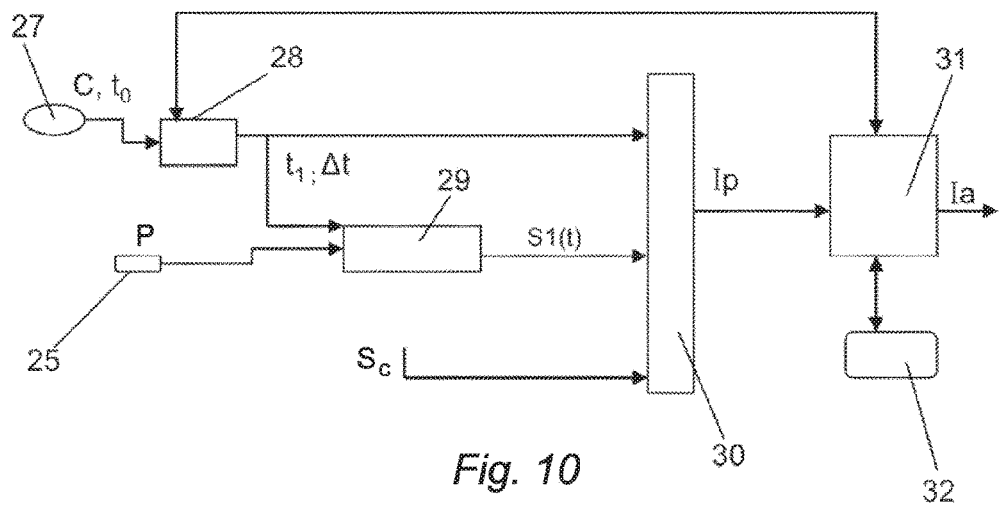
FIG. 10 is a functional diagram of a device implementing the second embodiment of a method according to the invention, in the installation shown in FIG. 7.

With reference to FIG. 10, a malfunction detection system suitable for implementing the method comprises an electronic circuit and sensors.

A first branch of the circuit is connected to the switching control system 27 of the valve 21. It comprises a clock module 28 which detects a closure control instruction C of the valve 21 at an instant $t_0$ and determines the limits of the time interval $[t_1, t_1+\Delta t]$ used for the signature test.

A second branch of the electronic circuit is connected to a sensor 26 of pressure P in the primary circuit of the engine 23, as indicated in the description of the method, and comprises a module 29 capable of filtering and deriving the signal P(t) of the sensor 26. Said module 29, connected to the clock module 28, supplies on leaving the signal form S1(t) over the time interval $[t_1, t_1+\Delta t]$.

A test module 30, receiving the signal S1(t) on leaving the module 29 for calculating the signal S1(t), connected to the clock module 28 and parameterised in accordance with the chosen threshold $S_c$, performs the signature test over the time interval $[t_1, t_1+\Delta t]$ following the closure control instruction C of the valve 21 and sends a logical malfunction or operational result Ip to a control module 31.

The control module 31 manages the logic described for the monitoring step using successive results Ip. It sends a malfunction alarm Ia if applicable and may control the storage of confirmed or unconfirmed malfunctions, according to circumstances, in a searchable memory 32.

Other Alternative Embodiments

Incorporating alternative embodiments to take account of the particularities of the system being monitored falls within the scope of the invention.

For example, in the second embodiment, step E0 may incorporate detection of the opening of the valve 21 in order to inhibit the launch of the subsequent steps should two control instructions C succeed one another too rapidly. If the two control instructions take place within too short a time period, the valve 21 may not have time to open and this alternative embodiment helps avoid associating the absence of a signature with a malfunction of the valve in this case. This type of modification may also be applied to the first embodiment.

The invention also relates to a combination of the first and second embodiments, for example if there is a wish to detect a malfunction on opening the discharge valve 21.

Figure 11:
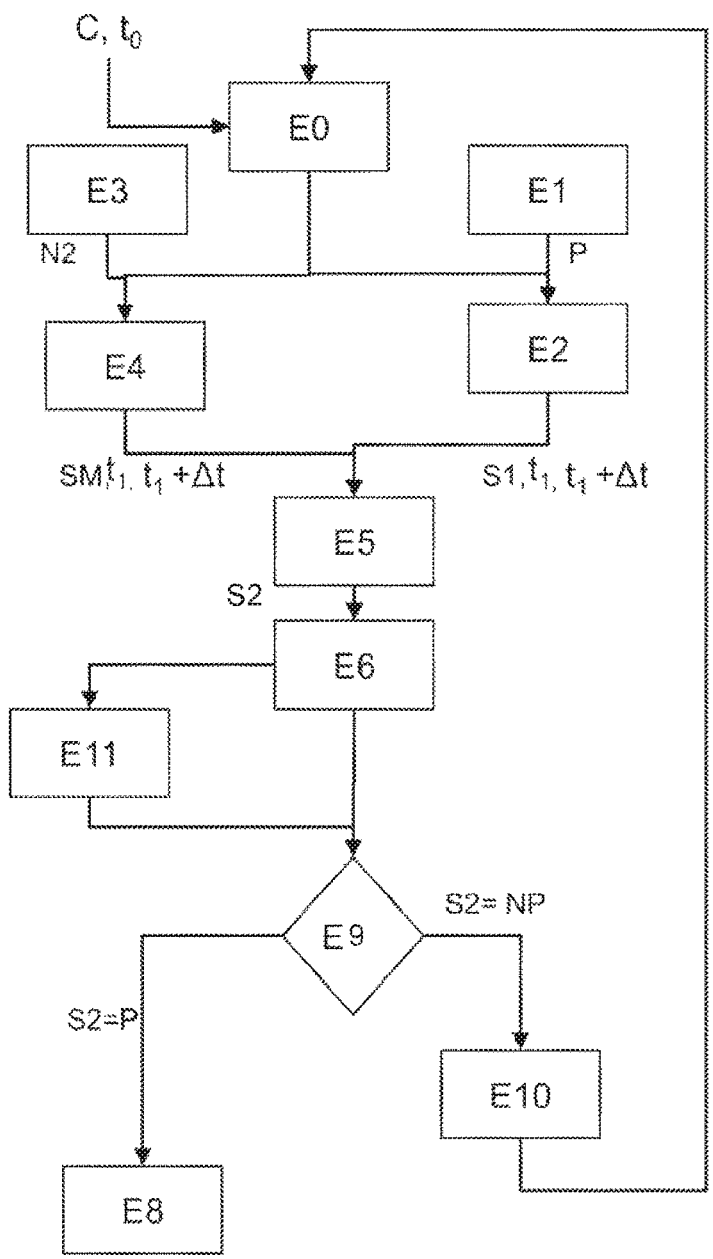
FIG. 11 shows an alternative embodiment combining the first and second embodiments shown.

In this case, with reference to FIG. 11, the method comprises the same steps as in the second embodiment in order to apply counting logic and avoid declaring a malfunction due to uncontrolled external events. However, the method also incorporates steps E3, E4 and E5 to desensitise the signal S1($t$) to the influence of the speed N2 of the engine 23 in order to apply the signature test in step E6 to a desensitised signal S2($t$).

The invention claimed is:

1. A method of monitoring a valve in a turboshaft engine, said valve switching, by closing and/or opening, in response to a control instruction sent at a determined instant, said method comprising:
   calculating a first form of a time signal (S(t)) from the change in a status variable of said turboshaft engine reacting to a switching of said valve;
   applying a signature test of the switching of the valve to a second form of said signal (S(t)) calculated from said first form, wherein the method further comprises:
     defining a time interval after sending said control instruction to perform said signature test;
     acquiring one or more parameters other than the switching of the valve;
     modeling a signal of said time signal (S(t)) in response to a change in said other parameter(s) to calculate its change; and
     calculating said second form of the signal from the first form of the signal by subtracting therefrom the change in the signal (S(t)) calculated from change in said other parameter(s), over said time interval following a control instruction.

2. The method of claim 1, in which said signal (S(t)) represents the time derivative of said status variable, preferably filtered.

3. The method of claim 2, in which said status variable is a gas pressure in a turboshaft engine circuit.

4. The method of claim 3, in which the operating signature of the valve corresponds to the test of the signal (S(t)) passing through a peak value that must exceed a given threshold, in a positive or negative direction.

5. The method of claim 1, in which a given period is introduced between the sending of the control instruction to switch the valve and said time interval.

6. The method of claim 1, comprising testing, during said defining a time interval, to determine the time interval for not launching the subsequent steps of the method if two opposite switching control instructions of the valve succeed one another within a given time period.

7. The method of claim 1, further comprising identifying the possible absence of a response to said signature test on the second form of the signal, in order to subsequently send a confirmed malfunction alarm on said valve.

8. The method of claim 1, comprising identifying a confirmed malfunction if no response has been obtained by said applying a signature test for a series of n consecutive control instructions including the current control instruction, n being greater than or equal to two, the absence of a confirmed malfunction being identified in the contrary case.

9. The method of claim 8, comprising storing in memory the result of said applying the signature test.

10. The method of claim 1, in which said valve is a valve supplying a jet ejector that depressurises at least one oil chamber of the turboshaft engine, the status variable is the pressure in an oil supply circuit of said chamber, and the other parameter influencing said signal is the rotational speed of the turboshaft engine.

* * * * *